Figure 1:
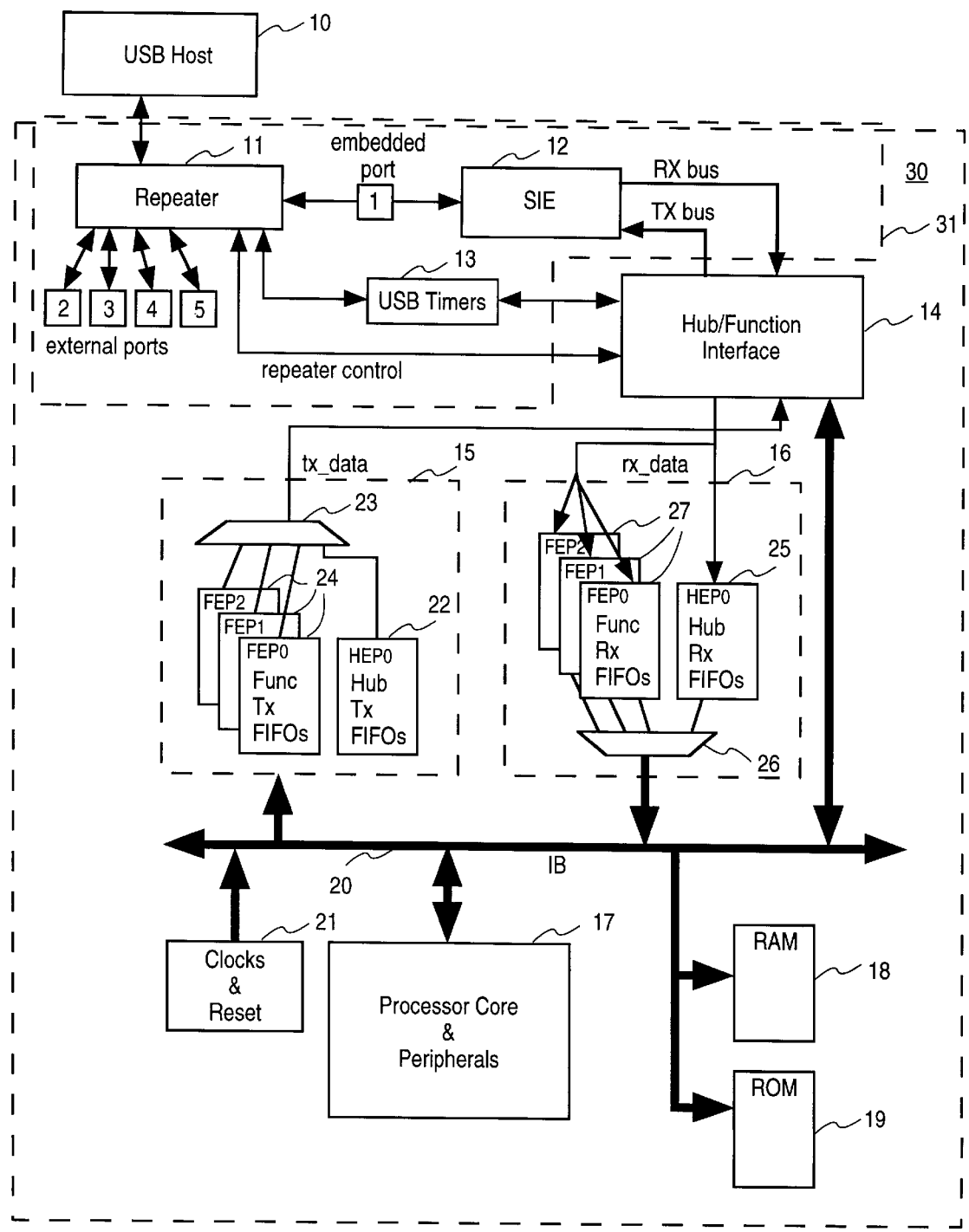

United States Patent [19]
Hu et al.

[11] Patent Number: 5,987,617
[45] Date of Patent: Nov. 16, 1999

[54] LOW ICC ENUMERATION SCHEME FOR BUS POWERED USB DEVICE

[75] Inventors: King-Seng Hu, Perai; Lay Leng Cheok; Vui Yong Liew, both of Penang, all of Malaysia; Joseph Murray, Scottsdale, Ariz.; Bruce Moore; Joseph Gaubatz, both of Glendale, Ariz.

[73] Assignee: Intel Corporation, Santa Clara, Calif.

[21] Appl. No.: 08/940,538

[22] Filed: Sep. 30, 1997

[51] Int. Cl.⁶ .................................................. G06F 1/32
[52] U.S. Cl. ........................... 713/320; 713/322; 713/501
[58] Field of Search ................................... 713/300, 326, 713/322, 501; 710/100, 129, 52

[56] References Cited

U.S. PATENT DOCUMENTS

| | | | |
|---|---|---|---|
| 4,698,748 | 10/1987 | Juzswik et al. | 713/322 |
| 4,897,662 | 1/1990 | Lee et al. | 343/701 |
| 5,153,535 | 10/1992 | Fairbanks et al. | 331/143 |
| 5,652,895 | 7/1997 | Poisner | 713/322 |
| 5,675,813 | 10/1997 | Holmdahl | 713/310 |

*Primary Examiner*—Glenn A. Auve
*Attorney, Agent, or Firm*—Blakely, Sokoloff, Taylor & Zafman LLP

[57] ABSTRACT

An apparatus and method of reducing power consumption in an integrated device having a first module with a mandatory operating frequency and a second module with a flexible frequency requirement. The integrated device is powered by a serial bus. The first module is segregated from the second module in the time domain by a frequency independent interface. The second module is then operated at a lower frequency when power conservation is needed. The operating frequency of the second module can be dynamically changed to improve performance of the second module when a power budget for the device permits.

19 Claims, 5 Drawing Sheets

| RX | | | | | | TX | | | | | | | | |
|---|---|---|---|---|---|---|---|---|---|---|---|---|---|---|
| (Cmd) | 14:11 | 10:4 | 3 | 2 | 1 | 0 | 9 | 8 | 7 | 6 | 5 | 4 | 3 | 2 | 1:0 |
| IN | 1001 | A | EP | | | | TE | L | OK | - | N | S | ISO | T | - |
| OUT | 10T0 | A | EP | | | | - | - | OK | RE | N | S | ISO | - |
| SETUP | 1101 | A | EP | | | | - | - | OK | RE | - |
| SOF | 01C1 | F | | | | | - |
| DATA Rx | T011 | RxD | - | | | | - | RE | - |
| DATA Tx | 1111 | - | | | | | TE | L | TxD |
| ACK | 0010 | - | | | | | - |
| EO Rx | T1C0 | - | | | | | - |

LOW ICC ENUMERATION SCHEME FOR BUS POWERED USB DEVICE

BACKGROUND OF THE INVENTION

1. Field of the Invention

The invention relates to reduction of power consumption. More specifically, the invention relates to reducing power consumption of an integrated microprocessor in a USB device to satisfy USB enumeration power requirements for bus powered devices.

2. Related Art

The Universal Serial Bus follows a protocol defined in Universal Serial Bus Specification, Version 1.0 (USB Spec). Modification of this specification can be expected from time to time. However, the USB Spec provides a standardized approach for peripheral interconnection with a host computer. The USB is set up in a tiered topology with a host on the top tier and USB hubs and functions on subsequent tiers. Each USB device, whether it be a hub or a function, has associated therewith a serial interface engine (SIE) which provides an interface between the hub or function and the transceiver which transmits or receives signals across the serial line. Generally, the SIE takes care of all the USB low level protocol matters such as bit stuffing, cyclic redundancy checks (CRCs), token generation, and handshaking.

From a power perspective, two types of USB devices exist, bus powered devices and self-powered devices. As the name implies, bus powered devices receive their required power supply from the USB. The USB Spec mandates that no bus powered device shall draw more than 1 unit current (100 mA) during enumeration. This extreme power limitation has precluded the integration of general purpose high performance microcontrollers into the USB module. Instead, stand alone USB controllers have been used to implement USB devices. This reduces a flexibility of the devices and requires increased technical support as multiple products must be maintained and supported instead of a single general purpose high performance microcontroller.

In view of the foregoing, it would be desirable to be able to reduce the power consumption of a general purpose high performance microcontroller integrated into a USB module so as to satisfy the USB specification during enumeration.

BRIEF SUMMARY OF THE INVENTION

An apparatus and method of reducing power consumption in an integrated device having a first module with a mandatory operating frequency and a second module with a flexible frequency requirement is disclosed. The integrated device is powered by a serial bus. The first module is segregated from the second module in the time domain by a frequency independent interface. The second module is then operated at a lower frequency when power conservation is needed. The operating frequency of the second module can be dynamically changed to improve performance of the second module when a power budget for the device permits.

In one embodiment, the first module is a serial interface engine, and the second module is a processor core logic. The frequency independent interface (client interface) acts as a client for all transactions between the SIE and downstream endpoints. The SIE is always the master. The SIE provides a triggering event indicating a valid command is available. The client interface captures the command and provides an expected response within a predefined window before a next triggering event occurs.

BRIEF DESCRIPTION OF THE DRAWINGS

FIG. 1 is a block diagram of a system of one embodiment of the invention.

FIG. 2 is a block diagram of an example of synchronization logic employed by one embodiment of the invention.

FIG. 3 is a timing diagram of a transmit/receive window of one embodiment of the invention.

FIG. 4 is a table of commands in which receive commands are shown paired with their corresponding transmit response.

FIG. 5 is a diagram of signaling of both a SETUP and an OUT command in one embodiment of the invention.

FIG. 6 is a diagram of an IN command of one embodiment of the invention.

FIG. 7 is a diagram of a start-of frame (SOF) command of one embodiment of the invention.

DETAILED DESCRIPTION OF THE INVENTION

FIG. 1 is a block diagram of a system of one embodiment of the invention. A Universal Serial Bus (USB) host 10 is coupled to a repeater 11. The host 10 could be any prior art or future developed host complying with the USB Spec. The repeater 11 has external ports 2–5 and an embedded port 1. A serial interface engine (SIE) 12 is coupled to embedded port 1 and provides a serial interface with a hub and/or function coupled to the embedded port. The client interface 14 is coupled to the SIE by a transmit bus (TX bus) and a receive bus (RX bus). The client interface may also be referred to as a backend interface. To allow for low power operation, a frequency independent interface is required to permit segregation between a frequency mandated by the USB Spec and a low power frequency for modules not required to operate at the mandated frequency. In one embodiment, the client interface 14 is a frequency independent interface and serves as the point of segregation between the two time domains.

A layer of transmit data buffering 15 and receive data buffering 16 is provided between the client interface 14 and the local bus 20. The transmit data buffering layer 15 provides a FIFO for each endpoint, the FIFOs for buffering data to be transmitted upstream, i.e., in the direction of the host. Similarly, the receive data buffering layer 16 also provides a FIFO for each endpoint. The FIFOs buffering data directed downstream, i.e., to the hub or function endpoints within the device. A multiplexor 23 is provided to select between the function endpoint FIFOs 24. Similarly, a multiplexor 26 is provided to select between the function receive FIFOs 27 and hub receive FIFOs 25. A processor core and peripherals reside on the internal bus (IB) 20. Additionally, a random access memory (RAM) 18 and a read only memory (ROM) 19 are also coupled to the IB 20. Clocking for the circuits below the client interface 14 is provided by the clocks and reset unit 21.

Assuming that the device is a full speed device, the USB operates at 12 MHz, and the data stream coming from repeater 11 to SIE 12 is a serial stream at 12 Mb/sec. When the various modules 14 through 19 are integrated on a single chip and operating at 12 MHz, it is not possible to satisfy the USB enumeration current requirements. Moreover, merely shutting off, for example, the processor core and peripherals 17, is not an acceptable solution because enumeration is not a purely hardware event. Rather, the core 17 must be active to run some software to tell the host 10 the transfer mode desired, bandwidth, and expected power requirements, among other things. Moreover, it is important that the core and peripheral 17 are active so that they can wake up very rapidly in response to an incoming transaction. To satisfy both of these requirements, in one embodiment of the invention, the frequency at which the processor core and peripherals 17 operates during enumeration is reduced. Because the core and peripherals 17 conduct transactions in bytes or words, while the SIE 12 receives a bit stream at 12 MHz, a theoretical minimum clock speed for the processor core is 1.5 MHz. This is because 12 MHz bit stream implies 1.5 M bytes/sec. Since the client interface 14 receives bytes, it need only receive a transaction ⅛th as fast as the SIE. As a practical matter, it has been found that redundancy makes a 3 MHz clock speed desirable to ensure reliability, and to meet turn-around response timing required by the repeater 11. Repeater 11 in turn is required to meet response timing of the USB protocol.

As noted above, to operate the backend (e.g., everything downstream of the client interface) at a different clock frequency than the serial interface engine and the rest of the USB system requires a frequency independent interface. In one embodiment of the invention, the frequency independent interface is provided by client interface 14. Client interface 14 segregates the device into two time domains. The first time domain 31 is applicable, the repeater 11 and the SIE 12. The second time domain 30 applies to all units downstream of the client interface 14. In one embodiment of the invention, a software settable control register is provided to dictate the operating frequency in the second time domain 30. It is preferred that the control register always defaults to low power mode on reset or when the device becomes unconfigured so that enumeration power requirements will be met. In one embodiment, low power mode implies a clock frequency of 3 MHz. The software settable nature of the clock mode is particularly desirable because it permits the core to change the frequency and, therefore, the power requirements of the device at any time under firmware control. Once enumeration is complete, the frequency of the core can be adjusted upward to improve performance by merely resetting the control register appropriately to select another supported frequency. It is still necessary for the device to remain within the power budget granted by the host. It is expected that the core can be operated at 6 MHz, 12 MHz, or possibly even 24 MHz, and satisfy USB power requirement after enumeration.

In the prior art, the SIE was fully synchronized with the backend interface, the SIE was required to tell the backend interface that the buffer was full, and the backend interface was required to handshake to tell the SIE that it had read the buffer. This required a minimum speed of 12 MHz to perform all the required handshaking. To permit operation of the backend at a lower frequency, this protocol must be discarded.

One embodiment of the invention such as that described with reference to FIG. 3 below employs a pseudo-handshaking system in which the SIE 12 is always the master and the client interface 14 is always the client. All communication on the client interface is initiated by and controlled by the SIE. The client receives command or data from the SIE on the RX bus, and an appropriate response is transmitted to the SIE on the TX bus. Each new command from the SIE is signaled by a strobe signal (STRB). Bus throughput is maximized by using toggle signaling, and by not requiring an acknowledge to the STRB. Therefore, the client is required to recognize the STRB, latch the command, and provide the appropriate response before the next STRB, and in time to meet valid_token/token-error and data setup time requirements. The STRB serves as a triggering event, and data on the RX bus remains valid until the next STRB (triggering event). If buffering is required to maintain the throughput, then it is the responsibility of the client to provide such buffering.

A digital-phase-locked-loop (DPLL) is employed to extract a clock (CLK1X) from the asynchronous data stream. The DPLL operates from a clock (CLKnX) which runs at "n" times the data rate (in the embodiment "n"=4). The DPLL detects transitions on the input data stream, and produces an output clock CLK1X which is at the data rate, and in phase with the data. Due to jitter and small differences in frequency between CLKnX and the transmitters clock it is occasionally necessary to adjust the phase of output clock CLK1X. This requires "growing" or "shrinking" one CLK1X period to retard or advance the phase of CLK1X. The minimum distance between adjacent STRBs is eight CLK1Xs (because of, this can be as little as thirty-one CLK4Xs). This is also the earliest that the SIE will sample the client response. This provides a window within which the client must respond. Therefore, the client must drive the TX bus in time to be setup on the ninth CLK1X pulse after the strobe was toggled. Because the SIE may sample TX later than this, the client must hold TX valid until the next STRB. There is no maximum distance between adjacent STRBs. A critical feature of the toggling employed is that the client interface must be able to readily identify the toggle and synchronize responses and incoming data with the local clock (LCLK).

Figure 2:
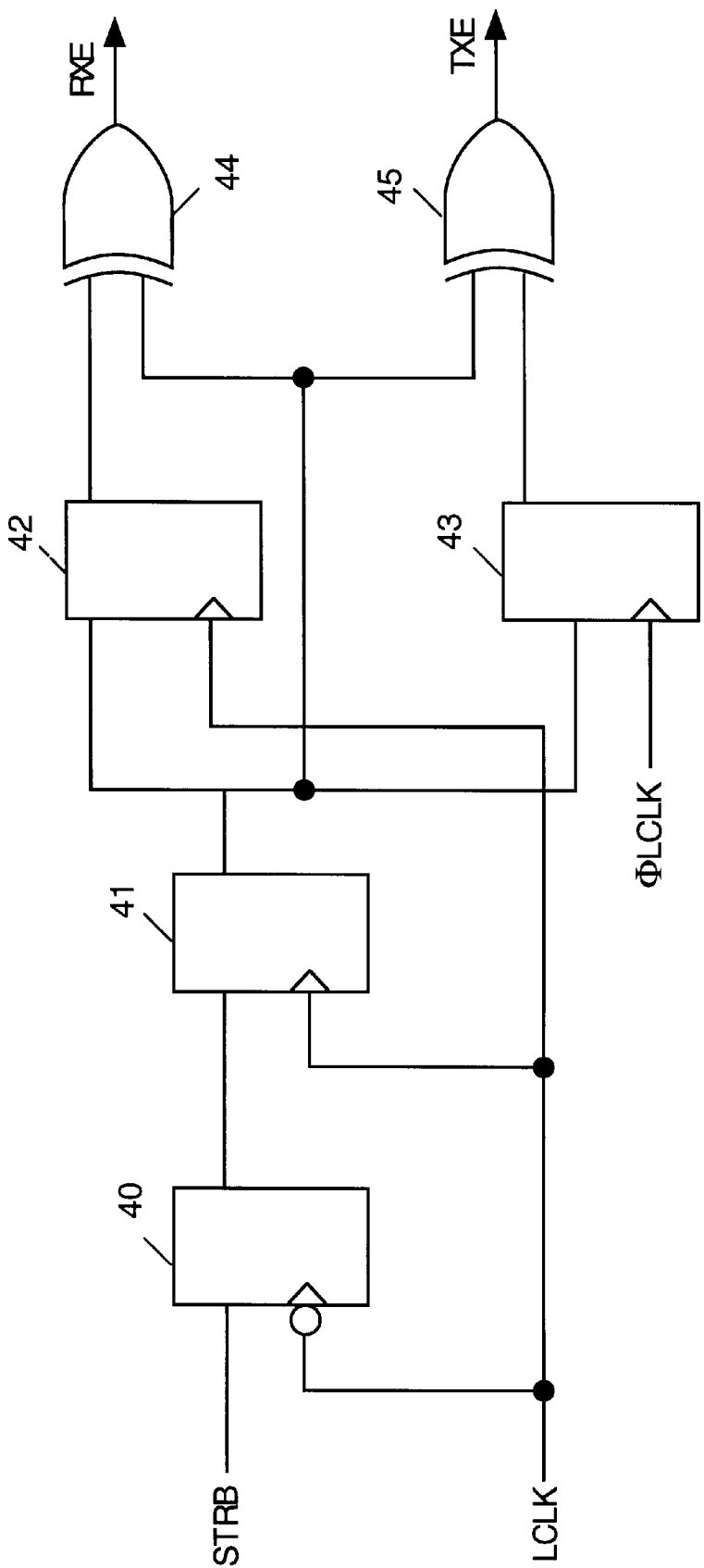

FIG. 2 is a block diagram of an example of synchronization logic employed by one embodiment of the invention. The synchronization logic exists within the client interface and has the purpose of detecting strobe toggles. The strobe signals input to a flip-flop 40 which is enabled by a phase shift of the local clock. Flip-flop 40 is coupled to flip-flop 41 which is enabled by the local clock. The output of flip-flop 41 simultaneously drives flip-flops 42 and 43, as well as one input of exclusive OR gates 44 and 45. Flip-flop 42 is enabled by the local clock, while flip-flop 43 is enabled by 180° phase shift of the local clock. Flip-flops 42 and 43 provide, respectively, the second input for exclusive OR gates 44 and 45. The outputs of exclusive OR gate 44 is a pulse (RXE) used to latch data into the client interface from the RX bus. The output of exclusive OR gate 45 (TXE) is used to latch in data from the FIFOs and place it on the TX bus. In this manner, a strobe signal which is toggled by the SIE is readily detected by the client interface and incoming data and outgoing data is appropriately synchronized with the local clock.

Figures 3, 4:
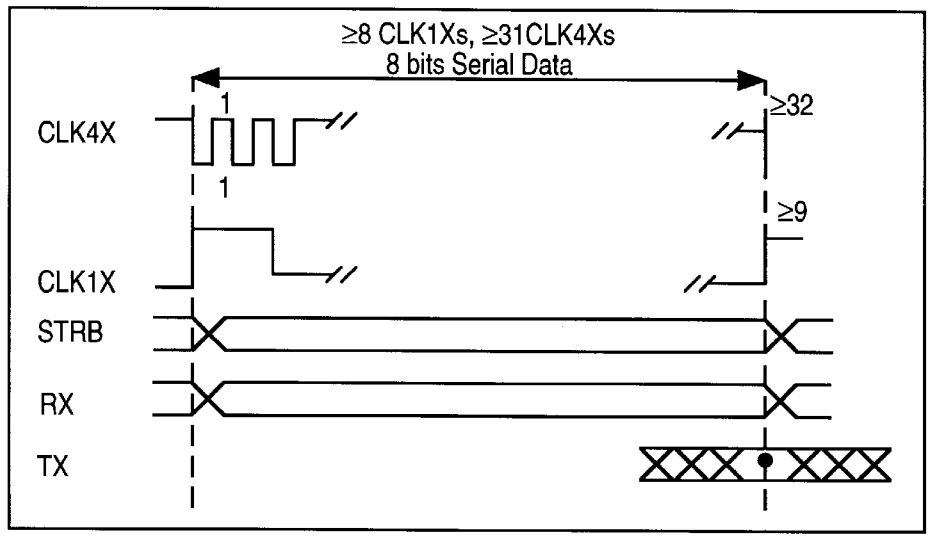

FIG. 3 is a timing diagram of a transmit/receive window of one embodiment of the invention. On the rising edge of a 1x clock, the STRB is asserted. The STRB signal is defined to be a toggle signal so it is deemed asserted any time it changes from high to low or from low to high. After the STRB is asserted, the receive data is maintained valid for a minimum of eight 1x clock pulses or, equivalently, thirty-one 4xclock pulses (until the next STRB toggle). Sometime during this guaranteed window between STRB toggles, valid transmit data must be applied to the TX bus lines. What is meant by valid transmit data is described more fully in connection with FIGS. 4–8 below which show examples of one implementation of the transaction protocol of one embodiment of the invention.

FIG. 4 is a table of commands in which receive commands are shown paired with their corresponding transmit response. Communication between the SIE and the client is encoded onto the RX bus and TX bus. The command type is encoded onto upper RX, and is similar to the USB packet ID (PID) from which the command is generated. A "-" in the table indicates a don't-care, i.e., no valid information is present in the field at that time. The commands include IN, OUT, SETUP, start of frame (SOF), data receive (DATA RX), data transmit (DATA TX), acknowledge (ACK), and end of data receive (EO RX). For IN, OUT, and SETUP commands, the client is required to decode address and endpoint information and return a subset of flags as described below in connection with FIGS. 5–7. For the SOF command, the client is required to capture the frame number designated "F" in the table and the "C" flag which receives an error flag indicating a CRC or bit stuff error.

The remaining nomenclature of this table is as follows: "A" corresponds to the address of a targeted function. "EP" corresponds to the endpoint of the targeted function. As is well-known in the art, a function may have up to 16 endpoints. Thus, a four bit field is used to designate the endpoint. Similarly, a 7 bit field is used for the address, since up to 128 USB devices may reside under one host. RxD is the next byte of received data. TxD is the next byte of transmit data. L is a last data flag. When returned to the SIE by the client in response to an IN, L indicates a zero length data packet. When returned to the SIE by the client in response to a DATA TX, L indicates that the byte being sent is the last byte of transmit data. C is a received error flag. OK is an endpoint okay flag indicating whether the address and endpoint are within this function. T, RE, N, and S are all force error flags corresponding to forcing a transmit error, forcing a receive error, sending a NAK and sending a STALL, respectively. No more than one of these flags may be asserted at any time. ISO is an isochronous flag indicating that a decode of an address/endpoint expects isochronous data and, therefore, no handshakes should be expected on a current transaction. T is a data toggle flag.

Figure 5:
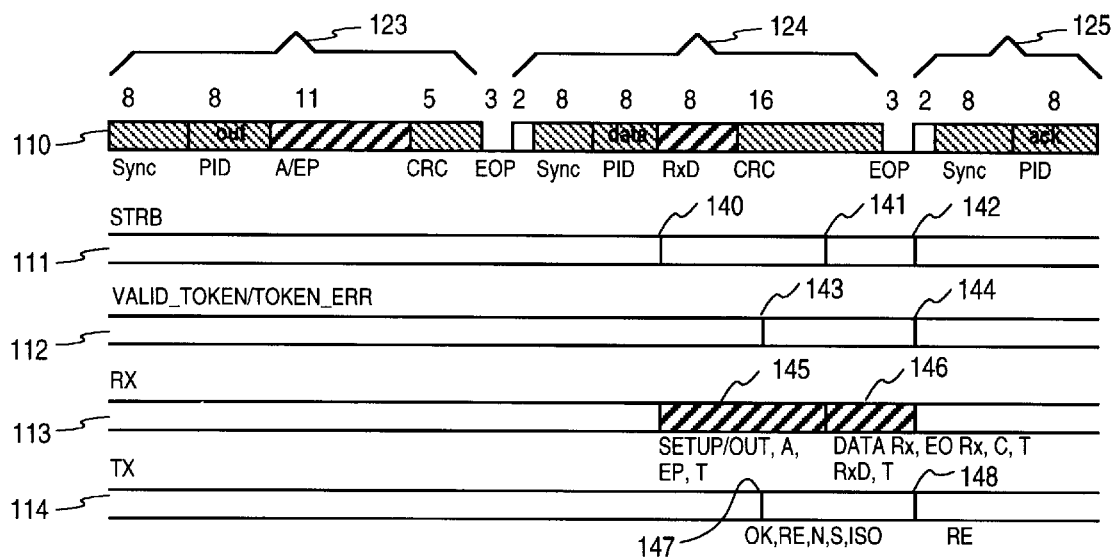

FIG. 5 is a diagram of signaling of a SETUP or an OUT command in one embodiment of the invention. The first row 110 of the diagram shows the signaling on the USB wire. Both the SETUP and OUT commands include a token packet 123, and a data packet 124 both originating from the host and an acknowledge packet 125 originating from the device. The remaining rows 111–114 are signals between the SIE and client interface. Row 111 shows the strobe signaling (STRB) which, as previously mentioned, is a toggle signal. Row 112 shows valid token signaling which is a sideband signal corresponding to the outcome of the CRC within the SIE. Row 113 shows signaling on the RX bus, and row 114 shows signaling on the TX bus.

The SIE receives the token packet 123 including an eight bit synchronization value, an 8 bit PID, 11 bits of address and endpoint information, and five bits for a cyclic redundancy check (CRC). The first strobe toggle 140 is delayed until the data PID is available. This supports prioritization of NAK versus toggle sequence mismatches. In response to strobe 140, a valid address and endpoint packet 145 is asserted on the RX bus. The client is required to capture this data and within the minimum window will provide a response on the TX bus as shown in row 114. As discussed above, the window is guaranteed to be at least eight 1XCLK pulses wide. As indicated in FIG. 4, the appropriate response to a SETUP command is a valid OK and RE signaling. If the address and endpoint are within the function served by the client interface, OK will be asserted, and the SIE will interact with the host to complete the transaction. If not, the received data packet will not be forwarded to the client, and the SIE will not transmit an ACK to the host. If RE is asserted, a receive error is forced meaning the SIE does not send an acknowledge to the host. For the OUT command, the client must then assert valid OK, RE, N, S and ISO signals before the next STRB toggle 141. Here, OK and RE have the same effect as in the SETUP command, but assertion of the N or S flags cause the SIE to send a NAK or STALL, respectively, to the host. Assertion of ISO indicates that the endpoint is an isocronous endpoint in such case hard shake packet 125 is not required to be sent by the SIE.

In response to strobe toggle 140, as shown in row 111, a valid SETUP address and endpoint data 145 is asserted on the RX bus. The client will sample this data and within the minimum window will provide a response on the TX bus as shown in row 114. The data on the TX bus is valid after point 147 and remains valid until strobe toggle 141 at which point this information is latched into the SIE. There is no maximum distance between strobe toggles. Therefore, the client must hold the TX bus valid indefinitely until the next strobe arrives. Also, on strobe toggle 141 the packet corresponding to a DATA RX command 146 has been encoded onto the RX bus. The client latches in this packet, and then asserts the valid RE signal at point 148.

Figure 6:
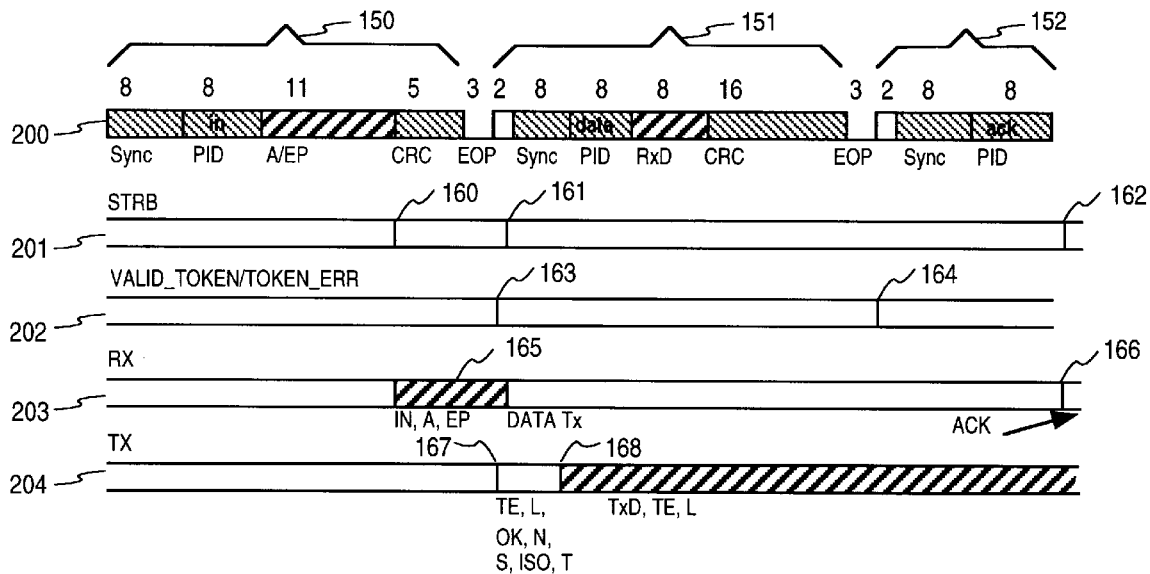

FIG. 6 is a diagram of an IN command of one embodiment of the invention. Rows 200–204 are analogous to rows 100–104, respectively. The host drives a token packet 150 to the SIE indicating that a particular address and endpoint may transmit data upstream. The SIE then drives the data packet 151 upstream and ACK packet 152 is returned by the host to the SIE. The SIE forwards the ACK to the client. In the case of the IN transaction, as soon as the address and end point information is received, the strobe is toggled 160 and the valid command and address packet 165 is asserted on the RX bus. The client responds at 167 with OK, TE, L, N, S, ISO, and T. In the IN transaction, failure to assert OK causes the SIE not to fetch any data from the client, and it does not transmit anything to the host. Assertion of TE causes the SIE to generate a bit stuff error by transmitting a series of 1's to the host. The other signals function as discussed above. Immediately following this, the data TX command is asserted on the RX lines at strobe 161 and the client supplies valid data beginning at 168. As indicated before, the data must be held valid until a next strobe toggle 162 occurs. Strobe toggle 162 corresponds to the forwarding of the ACK at 166 on the RX bus.

Figure 7:
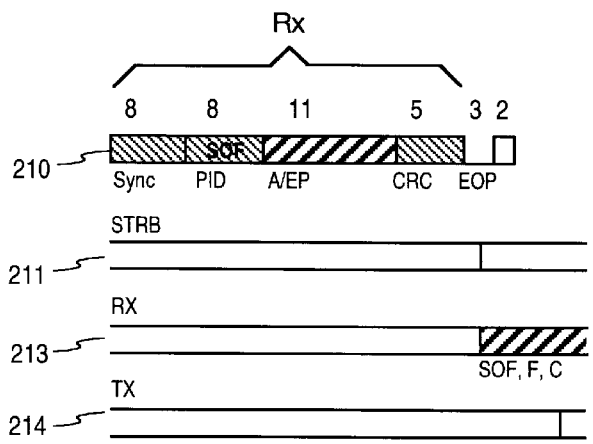

FIG. 7 is a diagram of a start-of frame (SOF) command of one embodiment of the invention. Rows 210–211 and 213–214 correspond to 100–101 and 103–104 of FIG. 4. Unlike the IN, OUT, and SETUP transactions the SOF is not forwarded to the client until after the CRC has been received and checked. This allows the SIE to include the result of the CRC (the C-flag in the command). Thus, the single strobe toggle occurs in line 211 indicating a valid SOF packet. The client must capture the F and C flags, but no response is required.

In the foregoing specification, the invention has been described with reference to specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense. Therefore, the scope of the invention should be limited only by the appended claims.

What is claimed is:

1. A method comprising the steps of:
   integrating a first module having a mandatory frequency requirement with a second module having a flexible frequency requirement to form a device;
   powering the device from a serial bus;
   segregating the first module from the second module in a time domain;

operating the second module at a lower frequency than the mandatory frequency to reduce current drawn by the device when low power is required; and dynamically increasing an operating frequency of the second module if a power budget permits operation at a higher supported frequency.

2. The method of claim 1 further comprising the steps of:

defining a window within which a response from the second module must be received by the first module once a triggering event occurs;

providing the triggering event from the first module to the second module when a transaction is desired;

receiving a first plurality of signals following the triggering event; and responding with a second plurality of signals within a predefined window after the triggering event.

3. The method of claim 1 further comprising the step of:

defaulting to the lower frequency during enumeration and any time the device becomes unconfigured.

4. The method of claim 1 further comprising the step of:

setting a control register to cause a desired operating frequency to be used.

5. The method of claim 1 wherein the second module is single chip high performance microcontroller using less than 100 mA of current in a low power mode but controlling 12 MHZ serial operation.

6. An apparatus comprising:

a first module having a mandatory operating frequency;

a second module having a plurality of possible operating frequencies; and an interface unit coupling the first module to the second module, the interface unit providing a time domain boundary between the first module and the second module;

wherein the second module operates at a frequency below the mandatory operating frequency when reduced current draw is desired.

7. The apparatus of claim 6 wherein the first module is a serial interface engine (SIE) coupled to a Universal Serial Bus (USB) and wherein the second module is a core logic module.

8. The apparatus of claim 7 wherein the core logic module defaults to a low power mode on reset so that the current drawn during USB enumeration does not exceed 100 mA.

9. The apparatus of claim 7 wherein the SIE toggles a strobe signal responsive to a receive transmission being ready to be sent to a client interface.

10. The apparatus of claim 7 wherein a next strobe toggle does not occur for at least eight bit times.

11. A system comprising:

a serial bus;

a host processor coupled to the serial bus;

a bus powered device coupled to the serial bus, the bus powered device including a serial interface engine (SIE) required to operate at a frequency of the serial bus and a downstream module dynamically switchable to a lower frequency than the frequency of the serial bus.

12. The system of claim 11 wherein the bus powered device further comprises:

a frequency independent interface, coupled to the SWE by a first plurality of signal lines and a second plurality of signal lines, the SIE always being the master for transactions with the frequency independent interface.

13. The system of claim 12 wherein the serial bus is a Universal Serial Bus (USB).

14. The system of claim 12 wherein SIE places commands on the first plurality of signal lines and causes a triggering event, and wherein the frequency independent interface captures the commands in response to the triggering event and places a response on the second plurality of signal lines before a next triggering event, the next triggering event guaranteed not to occur for at least one byte time at the frequency of the serial bus.

15. The system of claim 11 wherein the bus powered device further comprises a transmit buffer and a receive buffer for a function endpoint.

16. A method comprising the steps of:

receiving a serial packet of bits from a host at a first clock rate;

asserting a strobe signal for at least a minimum time window;

providing a subset of the bits from the serial packet on a first plurality of signal lines when the strobe is asserted;

reading the first plurality of signal lines at a second clock rate; and providing a response in a predefined format on a second plurality of signal lines within the minimum time window.

17. The method of claim 16 wherein the minimum time window is equal to eight bit times at the first clock frequency.

18. The method of claim 16 wherein the strobe is deemed asserted on any toggle of the strobe.

19. The method of claim 18 further comprising the step of:

holding the response valid until a next toggle of the strobe.

* * * * *